United States Patent
Kirshenbaum

(10) Patent No.: US 6,804,570 B2
(45) Date of Patent: Oct. 12, 2004

(54) PREDICTING MANUFACTURING PROCESS FAILURES

(75) Inventor: Evan Randy Kirshenbaum, Mountain View, CA (US)

(73) Assignee: Hewlett-Packard Development Company, L.P., Houston, TX (US)

(*) Notice: Subject to any disclaimer, the term of this patent is extended or adjusted under 35 U.S.C. 154(b) by 312 days.

(21) Appl. No.: 10/067,595

(22) Filed: Feb. 4, 2002

(65) Prior Publication Data

US 2003/0149499 A1 Aug. 7, 2003

(51) Int. Cl.[7] .............................................. G06F 19/00
(52) U.S. Cl. ....................... 700/110; 700/32; 700/44; 700/109; 700/108; 702/84; 702/181; 438/14; 438/107
(58) Field of Search ..................... 700/21, 28, 36, 700/46, 52, 79, 104, 108, 110, 173, 174, 109, 32, 44; 702/181, 84; 438/4, 5, 14, 21, 107

(56) References Cited

U.S. PATENT DOCUMENTS

| | | | | |
|---|---|---|---|---|
| 5,539,652 A | * | 7/1996 | Tegethoff ..................... | 703/14 |
| 6,370,437 B1 | * | 4/2002 | Carter et al. .................. | 700/52 |
| 6,453,265 B1 | * | 9/2002 | Dekhil et al. ................. | 702/181 |
| 6,584,401 B2 | * | 6/2003 | Kirshenbaum et al. ..... | 701/202 |
| 6,591,257 B1 | * | 7/2003 | Martinka et al. ............. | 706/46 |
| 6,613,590 B2 | * | 9/2003 | Simmons ...................... | 438/14 |
| 6,625,511 B1 | * | 9/2003 | Suzuki et al. ............... | 700/110 |
| 6,687,558 B2 | * | 2/2004 | Tuszynski ..................... | 700/97 |
| 6,738,931 B1 | * | 5/2004 | Osborn et al. ................ | 714/37 |
| 2003/0004679 A1 | * | 1/2003 | Tryon et al. ................. | 702/182 |
| 2004/0054432 A1 | * | 3/2004 | Simmons ..................... | 700/110 |

* cited by examiner

*Primary Examiner*—Ramesh Patel

(57) ABSTRACT

A method for generating a predictor of failure of a manufacturing process. The predictor is generated by generating a candidate solution for the predictor and then determining a fitness of the candidate solution using fitness cases pertaining to the manufacturing process and a set of costs associated with the manufacturing process. The fitness may then be used to formulate a next generation of candidate solutions for a design method modeled on evolution.

16 Claims, 3 Drawing Sheets

PREDICTING MANUFACTURING PROCESS FAILURES

BACKGROUND OF THE INVENTION

1. Field of Invention

The present invention pertains to the field of manufacturing processes. More particularly, this invention relates to predicting manufacturing process failures.

2. Art Background

A typical manufacturing process includes an arrangement of process steps. Typically, each process step performs one or more functions pertaining to a product undergoing manufacture. In addition, a typical manufacturing process usually includes an end of line process step at which finished products are tested for failures. Tests may also be performed at many points along the process.

It would be desirable to predict which products undergoing manufacture will be fail and render the prediction at process steps earlier in the manufacturing process than the end of line tests. Such a prediction may be used to save the costs of running potentially defective items through to the end of the manufacturing process as well as the cost of manufacture for good parts that are later irrecoverably attached to defective parts. Such cost savings may reduce the overall cost of manufacturing products.

SUMMARY OF THE INVENTION

A method for generating a predictor of failure of a manufacturing process is disclosed. The predictor is generated by generating a population of candidate solutions for the predictor and then determining the fitness of each candidate solution using a fitness case pertaining to the manufacturing process and a set of costs associated with the manufacturing process. The fitness may then be used to formulate a next generation of candidate solutions for a design method modeled on evolution.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
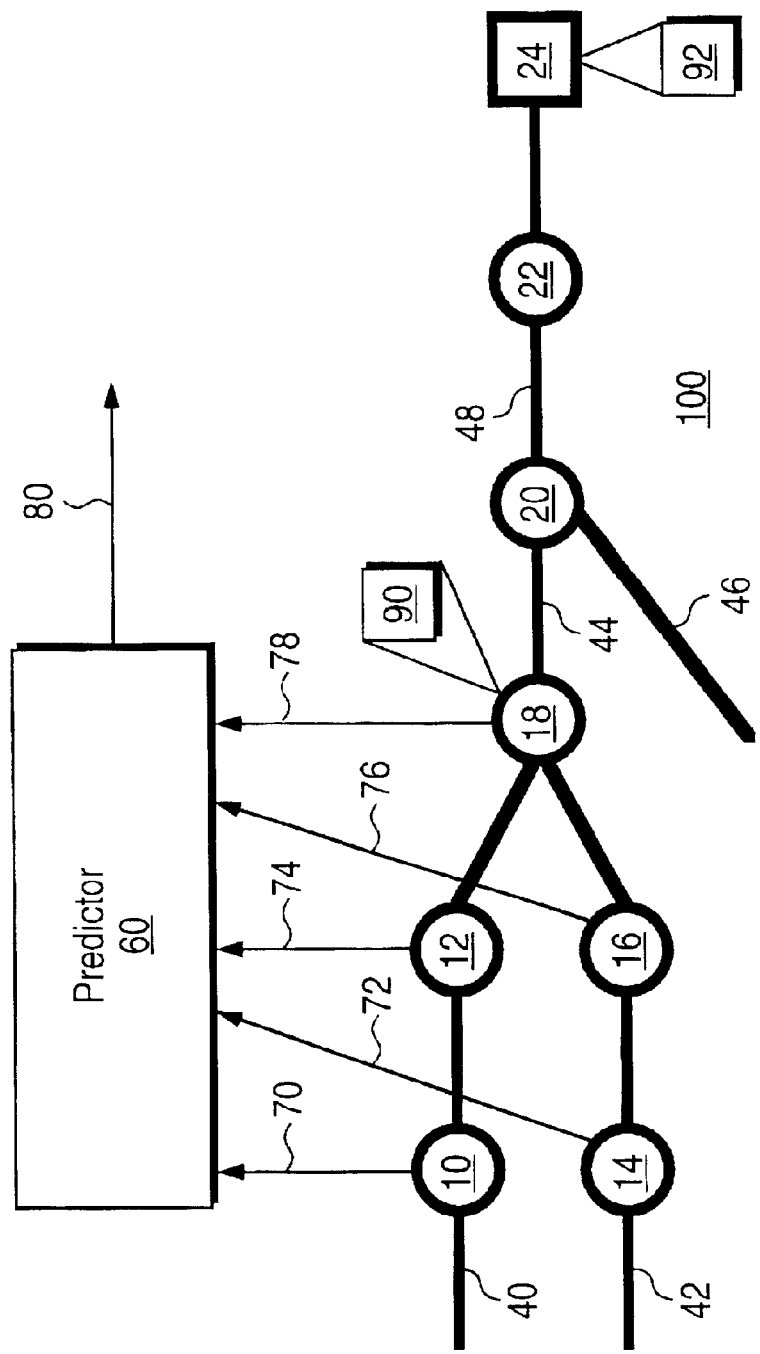
FIG. 1 shows an example manufacturing process that includes a predictor generated according to the present techniques.

FIG. 1 shows an example manufacturing system 100 that includes a predictor 60 according to the present techniques. The manufacturing system 100 includes a set of process steps 10–24 which are arranged along a set of manufacturing lines 40–48. Each process step 10–24 performs one or more functions associated with the manufacture of a product 92.

Examples of functions that may be performed at the process steps 10–24 include test and/or measurement functions, mechanical processes including machining and assembly, chemical processes, and electrical processes to name just a few examples. The selection and arrangement of the process steps 10–24 is designed in accordance with the nature of the product 92. The example arrangement the process steps 10–24 is provided only for purposes of illustration. The present teachings are readily applicable to any manufacturing process producing any product using any selection and arrangement of process steps.

In the example manufacturing system 100, a first subassembly is manufactured along the manufacturing line 40 and a second sub-assembly is manufactured along the manufacturing line 42. The first and second sub-assemblies are assembled together at the process step 18 into a final sub-assembly. An example result shown at the process step 18 is a final sub-assembly 90. The final sub-assemblies are merged with product housings carried on the manufacturing line 46 at the process step 20. The manufacturing line 48 takes the final sub-assemblies with product housing to the end of line 24 where final verification on manufactured product is performed—for example the product 92.

The predictor 60 generates a prediction 80 of eventual success/failure in the manufacture of a final product that will include a final sub-assembly currently located at the process step 18. In example shown, the predictor 60 generates the prediction 80 for the final sub-assembly 90 that will be included in the product 92. The prediction 80 if indicating failure may be used by the manufacturing system 100 to discard the final sub-assembly 90 or send it back for rework, etc. This bypasses one or more of the process steps 10–24.

The predictor 60 may be embodied as a classifier. Possible implementations of a classifier are numerous and include computer programs, Bayesian networks, neural networks, etc.

The predictor 60 determines the prediction 80 using a set of process data 78 obtained at the process step 18 and sets of process data 70–76 obtained at the prior process steps 10–16. Some or all of the process data 70–78 may pertain to the final sub-assembly 90 In addition, some or all of the process data 70–78 may pertain to parts or sub-assemblies other than those included in the final sub-assembly 90.

For example, the process data 78 may include measurements performed on the final sub-assembly 90 obtained at the process step 18 and/or test results from tests performed on the final sub-assembly 90 at the process step 18. In another example, the process data 74 may include measurements performed on a sub-assembly included in the final sub-assembly 90 and obtained at the process step 12 and/or test results from tests performed on the sub-assembly included in the final sub-assembly 90 at the process step 12. In yet another example, the process data 72 may include measurements performed on a set of parts that include a part which is included in the final sub-assembly 90 and which were obtained at the process step 14.

A predictor according to the present teachings may be associated with any process step in a manufacturing process. For example, predictors according to the present techniques may be provided at process steps along the manufacturing lines 40–42 to indicate the likelihood of success/failure of final products that include instances of the first and second sub-assemblies and/or parts thereof. In addition, predictors according to the present techniques may be provided anywhere along the manufacturing line 48.

The example predictor 60 is adapted to the manufacturing system 100 and the process step 18. In one embodiment, the predictor 60 is adapted by evolving the predictor 60 using a set of fitness cases which are obtained from historical records of the process data 70–78 and the corresponding success/failures of the resulting products.

Figure 2:
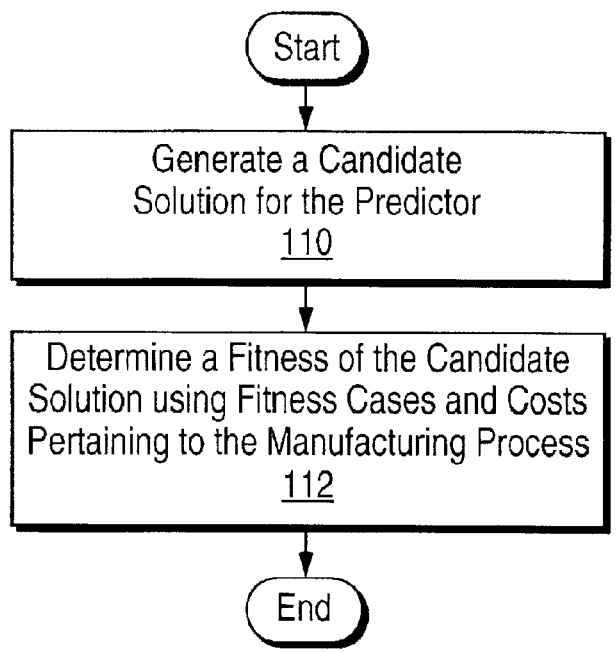
FIG. 2 shows steps in a method for generating a predictor of failure of a manufacturing process.

FIG. 2 shows a method for generating a predictor of failure of a manufacturing process. The method shown may be used to generate the predictor 60 or to generate predictors for other portions of the manufacturing system 100.

At step 110, a candidate solution for the predictor 60 is generated. An example of a candidate solution is a computer program. Another example of a candidate solution is a Bayesian network. Yet another example of a candidate solution is neural network. These are only example implementations of candidate solutions and others may be used in accordance with the present teachings.

A candidate solution in terms of an evolutionary design methodology may be referred to as an organism. The candidate solution generated at step 110 may be an organism in an initial population of organisms of an evolutionary methodology or may be an organism in a subsequent population of organisms in the evolutionary methodology. Organisms in an initial population may be generated randomly and organisms in subsequent populations may be formed by selecting parent organisms from a previous population based on their fitness and combining the parent organisms using operators which are modeled on the genetic processes of mutation and/or cross-over.

At step 112, a fitness of the candidate solution obtained at step 110 is determined using a set of the fitness cases pertaining to the manufacturing process and a set of costs associated with the manufacturing system 100. The fitness cases may be obtained from historical data pertaining to prior products yielded by the manufacturing system 100. The fitness of the candidate solution may be reinforced using cost data associated with the costs of mis-predictions by the candidate solution.

Figure 3:
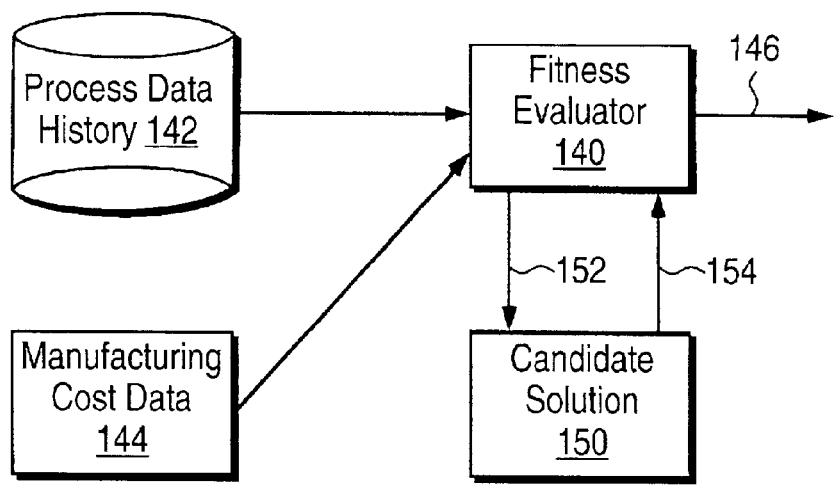
FIG. 3 shows a fitness evaluator which determines a fitness indication for a candidate solution for a predictor.

FIG. 3 shows a fitness evaluator 140 which determines a fitness indication 146 for a candidate solution 150 for the predictor 60. The fitness evaluator 140 obtains records from a process data history 142. The process data history 142 includes records of the process data 70–78 that was obtained for a set of prior final sub-assemblies yielded at the process step 18 along with indicators of the success/failure of the corresponding products determined at the end of line 24.

In addition, the fitness evaluator 140 obtains a set of manufacturing cost data 144 pertaining to the manufacturing system 100. The manufacturing cost data 144 indicates the costs associated with running the manufacturing system 100 and its sub-elements as well as revenues that may be obtained from the sale of final produces. The manufacturing cost data 144 may also include information such as the cost of restocking parts, etc.

Figure 4:
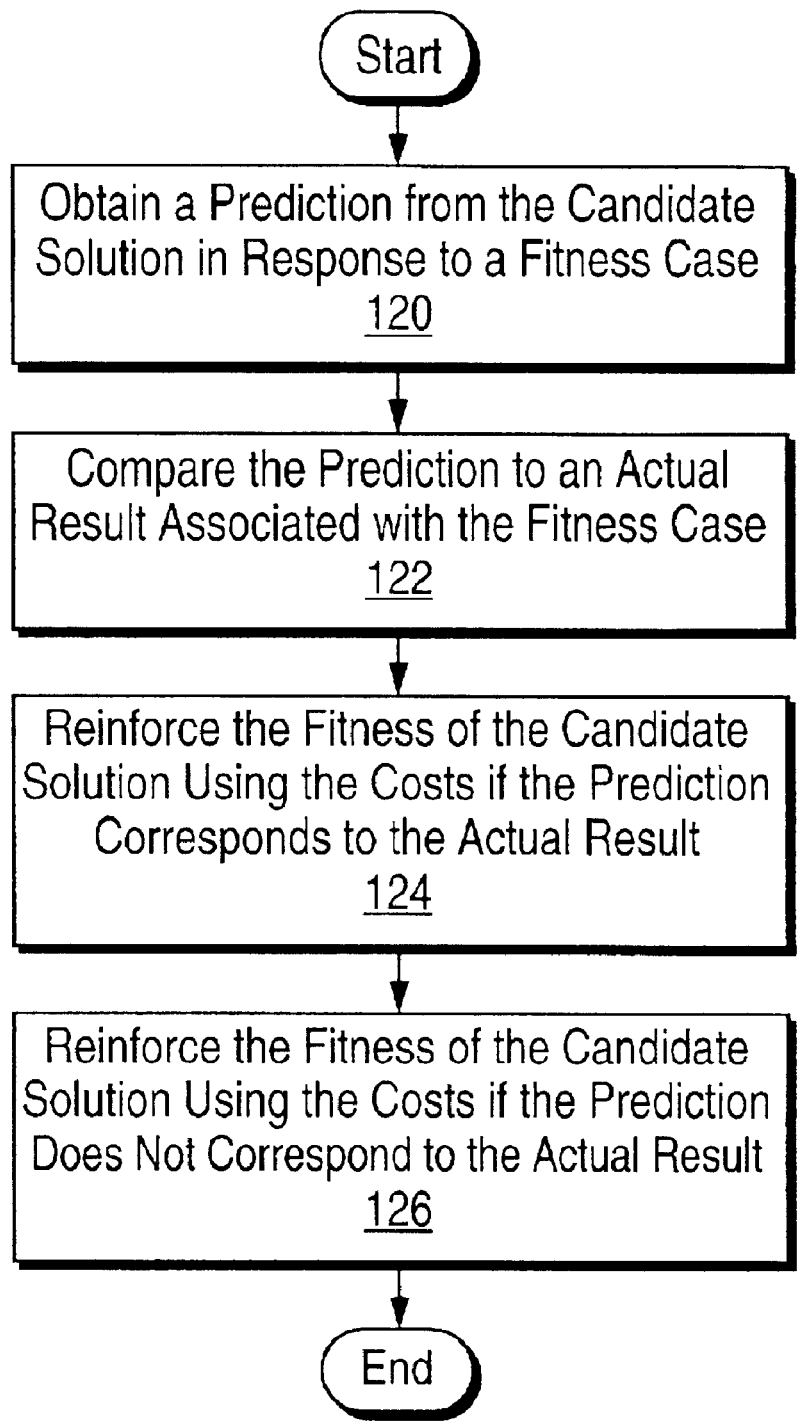
FIG. 4 shows a method for determining a fitness of a candidate solution.

FIG. 4 shows a method for determining a fitness of a candidate solution. The fitness evaluator 140 in one embodiment performs the steps shown when determining the fitness indication 146 in response to the candidate solution 150.

At step 120, the fitness evaluator 140 obtains a prediction 154 from the candidate solution 150 in response to a fitness case 152 obtained from the process data history 142. An example of a fitness case is a record of the process data 70–78 obtained for a prior final sub-assembly yielded at the process step 18. The fitness evaluator 140 obtains the prediction 154 by applying the fitness case 152 to the candidate solution 150 which may be implemented for example as a classifier. The resulting prediction 154 indicates the likelihood of success/failure of a final sub-assembly which is characterized by the fitness case 152.

The prediction 154 may be a number that indicates confidence of success/failure. The prediction 154 may be compared to a threshold value to yield a boolean success/failure indication. Alternatively, the prediction 154 may be treated as a probability which is used to scale the reinforcements applied to the candidate solution 150.

At step 122, the fitness evaluator 140 compares the prediction 154 to an actual success/failure result associated with the fitness case 152. The following matrix illustrates the possible relationships between the prediction 154 and the actual result associated with the fitness case 152.

|  | Success Predicted | Failure Predicted |
| --- | --- | --- |
| Actual Success | True Negative | False Positive |
| Actual Failure | False Negative | True Positive |

At step 124, the fitness evaluator 140 reinforces the fitness of the candidate solution 150 using the manufacturing cost data 144 if the prediction 154 corresponds to the actual result. Reward reinforcements correspond to true positive and/or true negative relationships.

Conversely, at step 126 the fitness evaluator 140 reinforces the fitness of the candidate solution 150 using the manufacturing cost data 144 if the prediction 154 does not correspond to the actual result. Reinforcement penalties correspond to false positive and/or false negative relationships.

In one embodiment, the reinforcement adjustment for a true positive result from the candidate solution 150 is the cost saving yielded by not running a final sub-assembly from the process step 18 to the end of line 24 as indicated in the manufacturing cost data 144. In such an embodiment, the reinforcement penalty for a false positive result from the candidate solution 150 is the loss of revenue from selling a final product minus the cost saving from not running a final sub-assembly from the process step 18 to the end of line 24. There is no reinforcement, neither reward nor penalty, for negatives whether true or false. This embodiment involves measuring the cost/benefit of adding a test to a running line. For negatives there is no effect because the product goes on as usual. For positives, on the other hand, cost is saved and in the case of false positives revenue is lost.

In another embodiment, the reinforcement adjustment for a true negative result from the candidate solution 150 is the revenue obtained from selling a final product minus the cost of running a final sub-assembly from the process step 18 to the end of line 24. In such an embodiment, the reinforcement penalty for a false negative result from the candidate solution 150 is the cost of running a final sub-assembly from the process step 18 to the end of line 24. There is no reinforcement adjustment for positives whether true or false. This embodiment involves treating the cost of reaching a point in the process and sunk and evaluating the expected return on the rest of the line. For positives, the product is discarded so there is no further cost or return. For negatives, the cost of reaching the end of the line is incurred and in the case of true negatives the revenue is obtained.

In yet another embodiment, the reinforcement penalty for a false negative result from the candidate solution 150 is the cost of running a final sub-assembly from the process step 18 to the end of line 24 while the reinforcement penalty for a false positive result is the cost needed to manufacture another final sub-assembly to be used as a replacement up to and including the process step 18. This embodiment involves measuring the distance from what is deemed a "perfect predictor" and examining only the cost incurred by being wrong.

The reinforcements based on costs may be used as the fitness indication 146 expressed in terms of dollars. Multiple fitness cases may be applied to the candidate solution 150 and the corresponding fitness indications 146 may be used to calculate overall average fitness value for the candidate solution.

In some embodiments, the fitness of a candidate solution may not take into account costs. For example, the fitness may be based on the accuracy of the candidate solution—e.g. the number of true positives and true negatives divided by the number of fitness cases. Other measures that may be employed include recall, precision, the geometric mean of recall and precision, as well as a variety of others.

The fitness values determined for different candidate solutions may be used to select the candidate solutions to be parents for generating a next generation of candidate solutions. For example, a set of candidate solutions having higher fitness may be more likely to be selected as parents than the candidate solutions having lower fitness. The candidate solutions in the next generation may have one or more characteristics obtained from their corresponding parents.

Some final sub-assemblies which the predictor 60 classifies as likely failures may be allowed to complete the manufacturing process. The predicted failures may then be tested at the end of line 24 to verify the efficacy of the predictor 60.

Some final sub-assemblies which the predictor 60 classifies as likely failures and which are allowed to complete manufacture may be used in combination with some of the final sub-assemblies which the predictor 60 classifies as likely successes to obtain data for additional fitness cases that may be used to evolve an improvement to the predictor 60. In addition, some final sub-assemblies which the predictor 60 classifies as likely failures may be allowed to complete manufacture to verify the efficacy of the predictor 60 even if it is not to be improved, for example, by retraining.

The present teaching may be employed to evolve predictors at each step of a manufacturing process. The fitness of predictors may depend on the selection of earlier or later predictors because the available precess data as well as cost increase along the manufacturing process. For example, a later predictor may take into account only those fitness cases that would be passed, i.e. corresponding products not discarded, by earlier predictors. For negative predictions a predictor may take into account only the cost of reaching a later predictor would indicate a positive result.

A predictor according to the present teachings may use data collected from prior sub-assemblies. This data may be in raw form or aggregate form such as mean, range, histogram, etc. For example, a particular combination of values may not in of themselves be reason to declare a part bad, but if a relatively large percentage of prior sub-assemblies have that combination then it increases the confidence in a failure prediction. A special case of this may involve examining the most recent pass/fail decisions from the predictor. In addition, data may be available from prior parts at subsequent steps in the process even up to a final test. In general, data collected temporally prior to the decision being made may be employed by a predictor.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A method for predicting success/failure of a final product being processed along a manufacturing line, the method comprising:

processing a subassembly of the final product at different processing stages along the manufacturing line;

obtaining current process data during at least one processing stage that is before assembly of the final product, the current process data including one of a measurement and a test performed on the subassembly at the at least one processing stage;

obtaining historical process data from prior subassemblies being processed along the same manufacturing line as the subassembly, the historical process data being from the prior subassemblies while at the at least one processing stage; and predicting, using both the historical process data and the current process data, success/failure of the subassembly if the subassembly is assembled to the final product, wherein predicting occurs before assembly of the final product.

2. The method of claim 1 further comprising:

determining actual success/failure for the prior subassemblies after being assembled to final products at an end of the manufacturing line, and including data from the success/failure for the prior subassemblies in the historical process data.

3. The method of claim 1 wherein predicting, using both the historical process data and the current process data, success/failure further comprises:

generating a prediction of success or failure for the subassembly; and comparing the prediction to a threshold value.

4. The method of claim 1 wherein predicting, using both the historical process data and the current process data, success/failure further comprises:

generating a prediction of success of failure for the subassembly; and comparing the prediction to previous actual successes or failures for the prior subassemblies that were assembled to final products.

5. The method of claim 1 further comprising:

predicting a failure for the subassembly before the subassembly is assembled into the final product; and completing assembly, along the manufacturing line, of the subassembly into the final product even after predicting the failure for the subassembly.

6. The method of claim 5 further comprising:

testing the final product to determine actual success or failure;

comparing the actual success or failure with the prediction of the failure; and modifying the step of predicting success/failure of the subassembly based on results from the step of comparing the actual success or failure with the prediction of the failure.

7. The method of claim 1 further comprising:

comparing actual success or failure of the final product with the prediction of success/failure of the subassembly to evolve and improve the step of predicting success/failure of the subassembly.

8. A computer-readable medium having computer-readable program code embodied therein for causing a computer to perform:
    obtaining current process data on a subassembly in a manufacturing line during at least one processing stage that is before assembly of the subassembly into a final product;
    obtaining historical process data from prior subassemblies processed along the same manufacturing line as the subassembly, the historical process data being from the prior subassemblies while at the at least one processing stage;
    predicting, using both the historical process data and the current process data, success/failure of the subassembly if the subassembly is assembled to the final product, wherein the predicting success/failure occurs before assembly of the final product;
    assembling the subassembly into the final product;
    verifying actual success/failure of the final product; and
    modifying performance of the predicting success/failure based on a result from the verifying actual success/failure of the final product.

9. The computer-readable medium of claim 8 wherein modifying performance of the predicted success/failure further comprises comparing the actual success/failure of the final product with the prediction of success/failure.

10. The computer-readable medium of claim 8 for causing the computer to further perform:
    obtaining current processing data on the subassembly at each of a plurality of different processing stages in the manufacturing line; and
    predicting, using both the historical process data and the current process data, success/failure of the subassembly at each of the plurality of different processing stages.

11. The computer-readable medium of claim 8 for causing the computer to further perform:
    predicting a failure for the subassembly before the subassembly is assembled into the final product; and
    completing assembly of the subassembly into the final product even after predicting the failure for the subassembly.

12. The computer-readable medium of claim 11 for causing the computer to further perform:
    determining actual success or failure of the final product;
    comparing the actual success or failure with the prediction of the failure; and
    modifying the step of predicting success/failure of the subassembly based on results from the step of comparing the actual success or failure with the prediction of the failure.

13. A method for predicting success/failure of a final product being processed along a manufacturing line, the method comprising:
    processing a subassembly of the final product at different processing stages along the manufacturing line;
    evaluating the subassembly at a processing stage, that is before assembly of the subassembly into the final product, to generate current process data;
    sending the current process data to a predictor;
    obtaining historical process data from prior subassemblies previously processed along the same manufacturing line as the subassembly, the historical process data being obtained from the prior subassemblies while at the processing stage; and
    predicting, with the predictor and using both the historical process data and the current process data, success/failure of the subassembly if the subassembly is assembled to the final product, wherein predicting occurs before assembly of the final product.

14. The method of claim 13 further comprising:
    assembling the subassembly into the final product;
    determining actual success/failure of the final product; and
    modifying the predictor based on accuracy of the step of predicting success/failure.

15. The method of claim further comprising:
    predicting failure of the subassembly;
    assembling the subassembly into the final product in spite of the prediction of failure of the subassembly;
    determining actual success/failure of the final product; and
    modifying the predictor based on accuracy of the step of predicting success/failure.

16. The method of claim 13 wherein the predictor generates a prediction and compares the prediction with a matrix of actual success/failure results from previous subassemblies evaluated at the processing stage along the same manufacturing line.

* * * * *